United States Patent
Voss et al.

(10) Patent No.: US 7,137,185 B2
(45) Date of Patent: Nov. 21, 2006

(54) TOOL HOLDER FOR SHRINK-FIT ATTACHMENT OF ROTATING TOOLS WITH PREDOMINANTLY CYLINDRICAL SHAFTS

(75) Inventors: Michael Voss, Leonberg (DE); Horst Wieland, Stuttgart (DE)

(73) Assignee: Bilz Werkzeugfabrik GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/003,861

(22) Filed: Dec. 3, 2004

(65) Prior Publication Data

US 2005/0135893 A1    Jun. 23, 2005

(30) Foreign Application Priority Data

Dec. 9, 2003    (DE)    ................................ 103 57 369

(51) Int. Cl.
*B23P 11/02*    (2006.01)
(52) U.S. Cl. .................. 29/447; 409/232; 409/234; 409/218; 279/156; 279/102; 408/239 R
(58) Field of Classification Search ................. 409/232, 409/234, 218; 29/447; 279/43.2, 46.3, 103, 279/156, 102
See application file for complete search history.

(56) References Cited

U.S. PATENT DOCUMENTS

| | | | |
|---|---|---|---|
| 2,778,651 A * | 1/1957 | Benjamin et al. | ............. 279/47 |
| 3,372,452 A * | 3/1968 | Firth et al. | ............. 29/888.061 |
| 3,678,632 A * | 7/1972 | Eversole et al. | ............. 451/342 |
| 5,311,654 A * | 5/1994 | Cook | ............. 29/447 |
| 6,260,858 B1 * | 7/2001 | DeLucia | ............. 279/102 |
| 6,280,126 B1 * | 8/2001 | Slocum et al. | ............. 409/141 |
| 6,315,506 B1 | 11/2001 | Mizoguchi | |
| 6,390,482 B1 * | 5/2002 | Hanoch | ............. 279/102 |
| 6,595,528 B1 * | 7/2003 | Voss | ............. 279/102 |
| 6,857,177 B1 * | 2/2005 | Taylor | ............. 29/447 |

FOREIGN PATENT DOCUMENTS

| | | |
|---|---|---|
| DE | 19638808 | 3/1998 |
| EP | 0618030 | 10/1993 |
| JP | 2002120115 | 4/2002 |
| JP | 2002283162 | 10/2002 |

\* cited by examiner

*Primary Examiner*—Monica Carter
*Assistant Examiner*—Eric A. Gates
(74) *Attorney, Agent, or Firm*—Michael J. Striker

(57) ABSTRACT

The invention relates to a tool holder (10) for shrink-fit attachment of rotating tools (11) with predominantly cylindrical shafts (12), having a chuck (13) with a clamping section (14) containing a conical receiving bore (15) to accommodate an insert (30) that has a cylindrical bore (32) to accommodate the tool shaft (12) and has a conical outer surface (31) to be contained in the receiving bore (15) of the clamping section (14). The insert (30) is embodied so that after the axial insertion of the insert (30) into the hot chuck (13), a contact is produced between the insert (30) and the chuck (13) on the one hand and between the insert (30) and the inserted tool shaft (12) on the other hand and, when the chuck (13) cools, the tool shaft (12) is clamped, wherein it is possible to bridge over large diameter tolerances while achieving maximum clamping forces (FIG. 1).

1 Claim, 1 Drawing Sheet

TOOL HOLDER FOR SHRINK-FIT ATTACHMENT OF ROTATING TOOLS WITH PREDOMINANTLY CYLINDRICAL SHAFTS

BACKGROUND OF THE INVENTION

The invention relates to a tool holder for shrink-fit attachment of rotating tools with predominantly cylindrical shafts.

In a known tool holder of this kind (U.S. Pat. No. 6,315,506 B1), the chuck is provided with a socket in the center for an insert; this central socket of the chuck has a cylindrical inner bore that widens out in an approximately conical fashion toward its open end. This socket can accommodate the entire length of an insert, which is correspondingly adapted to have one longitudinal segment with a cylindrical outer surface and an adjoining longitudinal segment with a conical outer surface, the two longitudinal segments being accommodated in a precisely fitting way inside the socket of the chuck. In the region of the cylindrical longitudinal segment, the insert has a threaded bore that is engaged by a coaxial threaded screw whose screw head is supported axially against the chuck. The insert is detachably fixed in the socket of the chuck by tightening this central screw; spaced axially apart from the threaded section that accommodates the screw, a cylindrical inner bore is provided to accommodate the tool shaft. The tool shaft is clamped radially by shrink-fitting action by means of the conical receiving bore in the clamping section of the chuck and the conical outer surface of the insert. In order to assure a secure clamping of cylindrical tool shafts in these chucks, the tool shafts must be manufactured very precisely, with small diameter tolerances, and must be matched to the bore of the insert. Furthermore, only relatively weak radial clamping forces can be produced. Tool shafts with large diameter tolerances, e.g. of the kind that occur in tools used for woodworking, cannot be clamped with a tool holder of this kind or can only be clamped in an unreliable way.

The object of the invention is to provide a tool holder of the type mentioned at the beginning, which permits a secure clamping, even of tool shafts with large diameter tolerances.

SUMMARY OF THE INVENTION

In a tool holder of the type mentioned at the beginning, this object is attained according to the invention by the characteristics in claim 1. Other particular characteristics of the invention and advantageous embodiments thereof ensue from the dependent claims. The embodiment of the tool holder according to the invention makes it possible to securely clamp even tool shafts with very large diameter tolerances and consequently, the tool holder is also suited to clamp tools with predominantly cylindrical shafts that have large shaft diameter tolerances, for example of the kind used in woodworking. On the whole, the tool holder is simply designed and inexpensive. It is advantageous that the socket can be inserted into the chuck without axial pressure when the chuck has not yet been heated. Even slight radial pressures lead then to a narrowing of the cylindrical receiving bore in the insert and thus to an adaptation of the diameter of this cylindrical bore to the diameter of the shaft of a tool that is inserted into the socket. After the chuck has been heated, the insert can be axially slid into the thermally expanded receiving bore of the clamping section easily and simply, e.g. without exerting force or by exerting only slight axial forces; due to the radial forces at work, the inner bore of the insert comes into contact with the tool shaft. The tool shaft is then securely clamped once the chuck has subsequently cooled. The insert can bridge over large diameter tolerances of the tool shaft. During the shrink-fitting procedure, no axial forces or only slight ones are needed to place the insert against the shrink-fitting chuck on the one hand and against the tool shaft on the other. The corresponding dimensioning of the taper angle of the receiving bore and the conical outer surface of the insert prevents the insert from being pushed out axially when the chuck contracts again during cooling. The tool holder has the overall advantage that even in the event of unfavorable tolerances, very high clamping forces can be achieved.

The subject of the invention also includes a method for clamping a tool in a chuck by means of shrink-fitting attachment according to claim 8. Advantageous other method characteristics and embodiments ensue from claims 9 and 10.

Other details and advantages of the invention can be inferred from the description given below.

The full wording of the claims is not given above simply to avoid unnecessary repetition, but is instead included herein by reference merely by being touched upon. All of these claimed characteristics, however, are at this point held to have been expressly disclosed as essential to the invention. All characteristics mentioned above and in the description below, as well as those characteristics that can be inferred from the drawings alone, are thus further components of the invention, even if they have not been expressly developed and in particular, are not mentioned in the claims.

The invention will be explained in detail below in conjunction with an exemplary embodiment shown in the drawings.

DETAILED DESCRIPTION OF THE PREFERRED EMBODIMENTS

Figure 1:
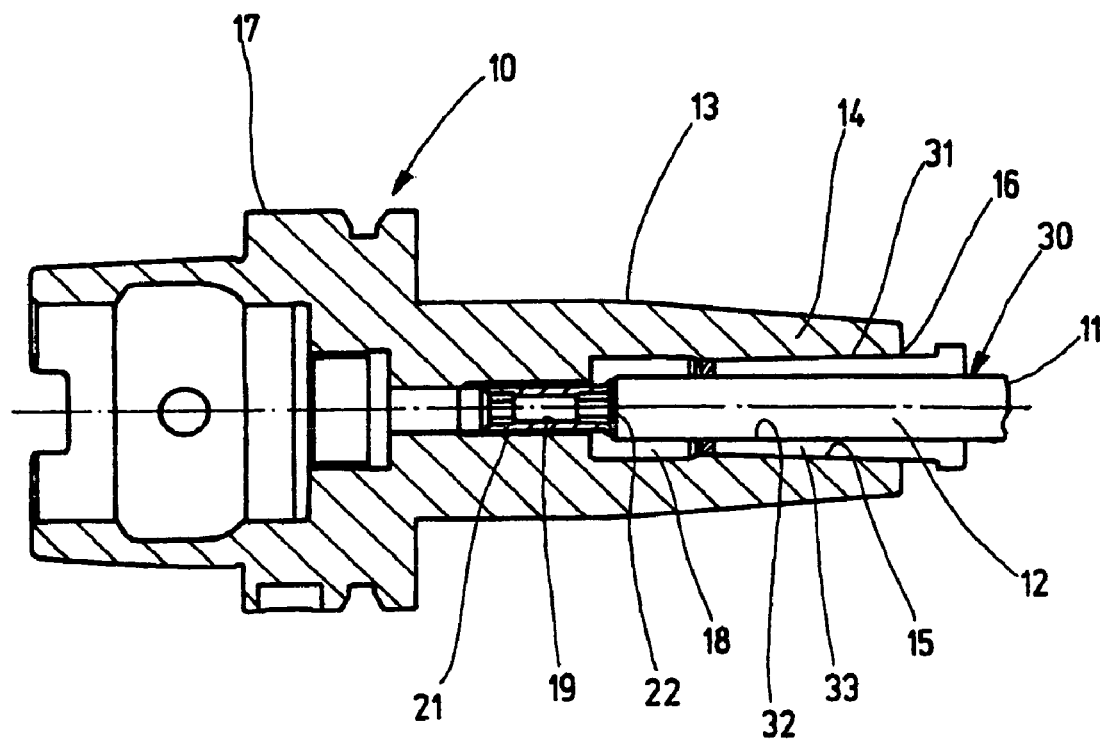
FIG. 1 shows a schematic axial longitudinal section through a tool holder with a tool clamped in it.
Figure 2:
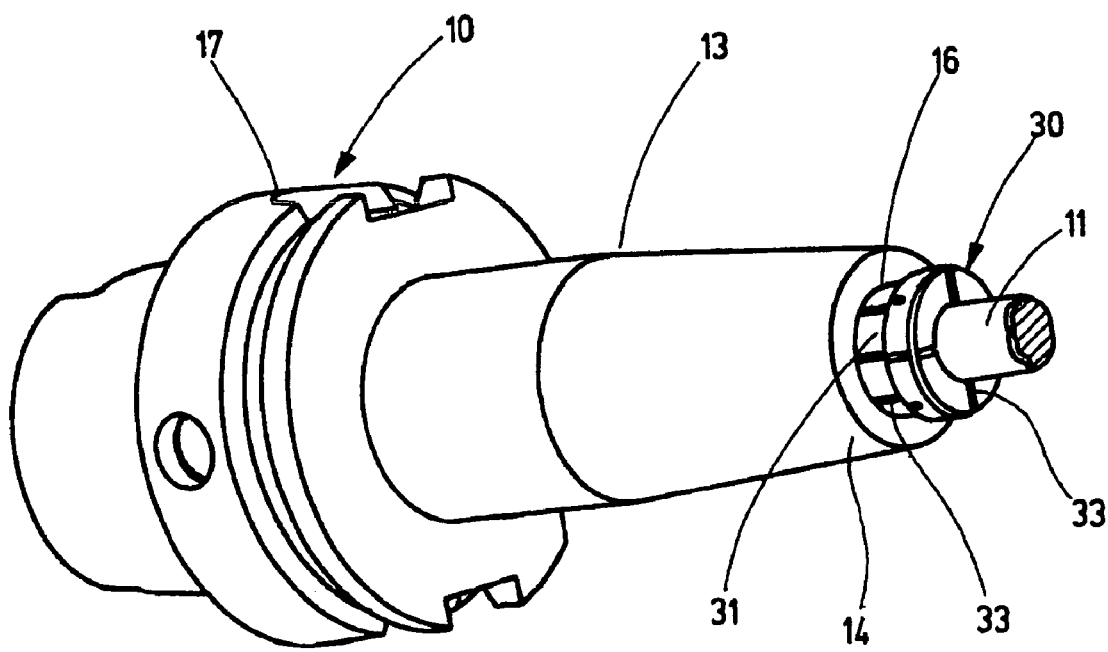
FIG. 2 shows a schematic perspective view of the tool holder in FIG. 1.

The drawings schematically depict a tool holder 10 for shrink-fit attachment of rotating tools 11, showing only the shaft 12 that is clamped in the tool holder 10. The tool holder 10 has a chuck 13 whose clamping section 14 has a central, conical receiving bore 15 that is open at the end 16 on the right in the drawing, and is used for insertion and accommodation of an insert 30. Adjoining the clamping section 14, the tool holder 10 has an end region 17, which is not important to the invention and can be embodied in any way a designer sees fit. With this end region 17, the tool holder 10 can be inserted in a known way, for example into a working spindle, not shown, of a machine tool. By contrast with the drawing, the end region 17 can also be embodied differently, depending on the given circumstances of the spindle. For example, it can also be embodied as a simple shaft, which is part of a separate chuck or can be detachably inserted along with the tool holder 10 into a separate chuck that can be accommodated in the working spindle of a machine tool.

The tool 11 can, in principle, be any tool. For example it is a drill bit, a router bit, or the like, and, clamped into the tool holder 10 by means of a shrink-fit, is driven to rotate. The shaft 12 of the tool 11 is cylindrical.

In the exemplary embodiment shown, the chuck 13 is embodied in a one-piece form. In another exemplary embodiment that is not shown, the chuck 13 can also be detachably connected to the tool holder 10.

Inside the chuck 13, the end of the conical receiving bore 15 opposite from the end 16 is adjoined by a cylindrical chamber 18, into which a coaxial adjusting screw 19 axially protrudes to a greater or lesser degree, which is contained in a rotationally adjustable fashion in a threaded bore 21 in the chuck 13 and for this purpose, can be accessed from the outside, e.g. axially. At the end oriented toward the shaft 12, the adjusting screw 19 can have a for example flat surface 22, which can press axially against the shaft 12. In this way, the adjusting screw 19 constitutes an axial stop for the tool 11 to be inserted and establishes the insertion depth depending on the position in which it is set. In addition, the adjusting screw 19 can also be used to push out a clamped tool 11, which is to be subsequently removed from the heated chuck 13, and therefore also makes it easier to detach the insert 30.

The insert 30 has a conical outer surface 31 whose taper angle is selected to be the same as that of the conical receiving bore 15 in the chuck 13; this taper angle is narrower than the self-locking angle so that the insert 30 is not pushed out axially by the contraction of the chuck 13 as it cools. Instead, in order to remove a clamped tool 11, the insert 30 can be easily withdrawn with no trouble once the chuck 13 has been heated. The insert 30 contains a cylindrical inner bore 32 to accommodate the cylindrical shafts 12 of tools 11. The material and/or structure of the insert 30 is/are embodied so that after axial insertion of the insert 30 into the chuck 13, which has been preheated inductively or in some other way, contact is produced between the outer surface 31 of the insert 30 and the receiving bore 15 of the chuck 13 on the one hand and between the shaft 12 of the tool 11 and the cylindrical inner bore 32 on the other, and when the chuck 13 cools, this tool shaft 12 is clamped by means of thermal shrinkage, which permits large diameter tolerances to be bridged over while maximum clamping forces are produced. This allows the insert 30 to be slid into the receiving bore 15 of the hot clamping section 14 without force or with the exertion of only slight axial forces. The clamping of the shaft 12 of the tool 11 occurs not due to the deformation resulting from the axial insertion of the insert 30 into the hot chuck 13, but due to the shrinkage of the chuck 13 as it subsequently cools. The tool holder 10 has the advantage that thanks to this particularly useful design of the insert 30, which is adapted to the shaft 12 of the tool 11 and the conical receiving bore 15 of the heated chuck 13, the entire dimensional difference—which is calculated by subtracting the diameter of the receiving bore 15 when the chuck 13 is cold from the diameter of the receiving bore 15 when the chuck 13 is hot—can be used to clamp the tool 11. In this way, very powerful clamping forces can be produced even when there are unfavorable tolerances. The tool holder 10 therefore makes it possible to securely and reliably clamp even tool shafts 12 with very large diameter tolerances. For example, this also includes tools 11 used in woodworking. The tool holder 10 is suitable for tools 11 with almost any degree of diameter tolerance in the shafts 12.

The insert 30 can have at least one longitudinal slit 33, which is open at one axial end of the insert 30 or at both ends. In the exemplary embodiment shown, the insert 30 has a number of longitudinal slits 33, for example six, spaced apart from one another in the circumference direction, that are open in alternating sequence at one end, shown that the right in the drawing, and at the opposite axial end.

A tool 11 is clamped in the chuck 13 as follows. Assuming that the conical receiving bore 15 does not currently contain an insert 30 and a tool 11, the insert 30 is introduced without axial pressure into the receiving bore 15 of the chuck 13, which is open at the end 16 because it contains neither an insert nor a tool. The inner bore 32 has a diameter that is larger than the diameter of the shaft 12 of the tool 11. This tool 11 is inserted with its cylindrical shaft 12 into the cylindrical inner bore 32 of the insert 30, the insertion depth of the tool 11 being established by means of the adjusting screw 19. In this position, the chuck 13, at least in the vicinity of the clamping region 14, is heated inductively or in some other way. The thermal expansion causes the conical inner bore 15 to expand. Then the insert 30 is inserted into the hot chuck 13 without force or with the exertion of only a slight amount of axial force, in order to bring the insert 30 into contact with the inside of the chuck 13 and the outside of the shaft 12 of the tool 11. As the chuck 13 subsequently cools, it shrinks, which securely clamps the tool 11 with the shaft 12. This makes it possible to bridge over even large diameter tolerances in the shaft 12 while achieving maximum radial clamping forces.

When the tool 11 is to be removed from the tool holder 10 again, then the chuck 13 is once again heated, at least in the vicinity of the clamping region 14, with the accompanying thermal expansion of the receiving bore 15. This releases the insert 30 from the receiving bore 15. If need be, the adjusting screw 19 is press axially against the end of the shaft 12 at the left in the drawing, thus pressing the tool 11 out from the heated chuck 13 in the event that the tool 11 and the insert 30 cannot be readily withdrawn from the heated chuck 13.

The invention claimed is:

1. A method for shrink-fit clamping rotating tools (11) with predominantly cylindrical shafts (12) in a chuck (13) having a clamping section (14) with an inner conical receiving bore (15) therein to accommodate an insert (30) that has at least one longitudinal slit (33) and has a cylindrical inner bore (32) to accommodate the tool shaft (12) with a conical outer surface (31) matching to said conical receiving bore (15) of the clamping section (14), wherein an adjusting screw (19) is contained in an adjustable manner in said chuck (13) coaxial to its conical receiving bore (15) and constitutes an axial stop for a tool (11) to be inserted, wherein said insert (30) with its conical outer surface (31) is inserted into said matching conical receiving bore (15) of the clamping section (14), the tool (11) to be clamped is inserted with its cylindrical shaft (12) into said cylindrical inner bore (32) of said insert (30), said adjusting screw (19) contained in the chuck (13) is set in order to adjust a desired axial insertion depth of the tool (11) that rests axially against the screw (19), the chuck (13), at least in an area of the clamping region (14), is heated to produce a thermal expansion, the insert (30) is then pushed axially into said conical receiving bore (15) of the clamping section (14), and thereafter, the chuck (13), at least in the area of the clamping region (14), is then cooled, so that large diameter tolerances of tool shafts (12) are bridged over with maximal damping forces, and wherein in order to remove the tool (11), the chuck (13), at least in the area of the clamping region (14), is heated to produce a thermal expansion and the adjusting screw (19) is turned exerting an axial force on the tool shaft (12) in order to push the tool (11) out from the heated chuck (13).

* * * * *